United States Patent [19]
Cooke et al.

[11] Patent Number: 5,994,705
[45] Date of Patent: *Nov. 30, 1999

[54] FLOW-THROUGH PHOTO-CHEMICAL REACTOR

[75] Inventors: Jeffrey A. Cooke; Glen D. Austin; Michael Jerome McGarrity, all of London, Canada

[73] Assignee: Labatt Brewing Company Limited, London, Canada

[*] Notice: This patent is subject to a terminal disclaimer.

[21] Appl. No.: 09/240,592

[22] Filed: Feb. 1, 1999

Related U.S. Application Data

[63] Continuation of application No. 08/946,647, Oct. 7, 1997, Pat. No. 5,866,910, which is a continuation of application No. 08/438,234, May 9, 1995, Pat. No. 5,696,380.

[51] Int. Cl.[6] .................................................. B01J 19/12
[52] U.S. Cl. ......................... 250/438; 250/437; 250/436
[58] Field of Search .................................. 250/438, 437, 250/436, 435

[56] References Cited

U.S. PATENT DOCUMENTS

| | | | |
|---|---|---|---|
| 3,567,921 | 3/1971 | Holiday | 250/45 |
| 3,657,087 | 4/1972 | Scott | 204/158 R |
| 3,769,517 | 10/1973 | Coleman | 250/455 |
| 3,924,246 | 12/1975 | Scherer | 340/173 SP |
| 3,998,477 | 12/1976 | Delahaye et al. | 285/93 |
| 4,002,918 | 1/1977 | Graentzel | 250/431 |
| 4,296,066 | 10/1981 | Schenck | 422/24 |
| 4,317,041 | 2/1982 | Schenck | 250/435 |
| 4,381,978 | 5/1983 | Gratzel et al. | 204/75 |
| 4,454,835 | 6/1984 | Walsh et al. | 118/712 |
| 4,476,105 | 10/1984 | Greenbaum | 42/648 R |
| 4,488,935 | 12/1984 | Ruhe | 202/177 |
| 4,544,470 | 10/1985 | Hetrick | 204/245 |
| 4,774,026 | 9/1988 | Kitamori et al. | 252/627 |
| 4,863,608 | 9/1989 | Kawai et al. | 210/638 |
| 4,868,127 | 9/1989 | Blades et al. | 436/146 |
| 4,957,773 | 9/1990 | Spencer et al. | 427/39 |
| 4,981,368 | 1/1991 | Smith | 366/337 |
| 5,045,288 | 9/1991 | Raupp et al. | 422/186.3 |
| 5,094,815 | 3/1992 | Conboy et al. | 422/52 |
| 5,126,111 | 6/1992 | Al-Ekabi et al. | 422/186.3 |
| 5,149,377 | 9/1992 | Esrom et al. | 118/723 |
| 5,866,910 | 2/1999 | Cooke et al. | 250/438 |

FOREIGN PATENT DOCUMENTS

| | | |
|---|---|---|
| 0063729 | 11/1982 | European Pat. Off. . |
| 0470518 A1 | 2/1992 | European Pat. Off. . |
| 539423 | 11/1931 | Germany . |
| 1807922 | 6/1969 | Germany . |
| 1212633 | 11/1970 | United Kingdom . |
| WO 90/00929 | 2/1990 | WIPO . |

OTHER PUBLICATIONS

A.M. Braun, M. Maurette, and E. Oliveros, Photochemical Technology, (Chichester, U.K.: John Wiley & Sons Ltd., 1991), Ch. 4, 152–201.

K.G. Bircher and K.M. Simms, Design of a UV Wastewater Disinfection System using HIgh Power Medium Pressure Mercury Arc Lamps for Optimum Mixing at Low Pressure Drop (Markham, Ontario: Calgon Carbon Corporation, 1997), 1–10.

UVDisinfection High Performance Technology (Markham, Ontario: Calgon Corporation, Sep. 1997).

Primary Examiner—Jack I. Berman
Attorney, Agent, or Firm—Levy & Grandinetti

[57] ABSTRACT

A flow-through photochemical reactor includes a reactor body, that circumscribes a longitudinally extending channel having a generally annular cross section. This channel accommodates fluids passing between an inner wall of the reactor body and an outer wall of a photon-transmitting tube that is housed internally thereof. In addition, the reactor includes mechanically static, fluid-dynamic elements for passively inducing substantial turbulent flow within a fluid as it passes through the channel. This arrangement substantially increases the uniformity of the fluid's exposure to photons radiating from a source within the tube into the fluid an it is conducted through the channel.

8 Claims, 3 Drawing Sheets

FLOW-THROUGH PHOTO-CHEMICAL REACTOR

This application is a continuation of U.S. application Ser. No. 08/946,647, filed on Oct. 7, 1997 now U.S. Pat. No. 5,866,910 which is a continuation of U.S. application Ser. No. 08/438,234, filed on May 9, 1995, now U.S. Pat. No. 5,696,380.

FIELD OF THE INVENTION

The present invention relates to photo-chemical reactors, and especially to flow-through chemical reactors that are particularly useful in facilitating photo-chemical reactions for "optically dense" fluid substrates.

BACKGROUND OF THE INVENTION

U.S. Pat. No. 3,998,477—dated Dec. 21, 1976, discloses a device for non-rigid connection of two rigid cylindrical pipes, which comprise the combined use of flexible double lipped gaskets and toroid flexible gaskets surrounding a bulb-shaped zone formed in one of the pipes. The device is particularly useful for fastening fragile tubes containing light emitters to metal reactors used for photochemical processes U.S. Pat. No. 4,002,918—dated Jan. 11, 1977, discloses an apparatus for the irradiation of fluids in which the fluid is conducted along the walls of a container having walls which are permeable for the radiation to which the fluid is exposed. Radiation sources are arranged around the container and an active rotor is disposed within the container. The rotor consists of a body having axial bores and pins movably disposed in the bores and adapted to engage with their front ends the container walls thereby to wipe any deposits from the container walls during rotation of the rotor.

U.S. Pat. No. 4,317,041—dated Feb. 23, 1982, discloses various embodiments of photo-reactors in which there are at least two radiation chambers with a window arranged therebetween. UV radiation is introduced into one of the chambers at a side opposite the window so that it passes through that chamber, through the window and into the other chamber. The fluid medium to be purified is passed through the chambers and subjected to the radiation while in the chambers. The flow of the medium is through the chambers in series in some embodiments and in parallel in others. An embodiment is disclosed wherein a recirculation line is established around the reactor with the recirculation being continuous or intermittent. When intermittent the purified fluid medium also is drawn off intermittently, between the periods of recirculation. In some embodiments, the amount of radiation traversing all the chambers is monitored. If the monitored amount drops below a given amount, the apparatus is shut down. Alteratively, the rate of flow of the medium is adjusted, based on that monitored amount, with the rate of flow increasing or decreasing, respectively, in response to increases or decreases in that amount.

U.S. Pat. No. 4,476,105—dated Oct. 9, 1984, relates to a process for producing gaseous hydrogen and oxygen from water. The process is conducted in a photolytic reactor which contains a water-suspension of a photoactive material containing a hydrogen-liberating catalyst. The reactor also includes a column for receiving gaseous hydrogen and oxygen evolved from the liquid phase. To avoid oxygen-inactivation of the catalyst, the reactor is evacuated continuously by an external pump which circulates the evolved gases through means for selectively recovering hydrogen therefrom. The pump also cools the reactor by evaporating water from the liquid phase. Preferably, product recovery is effected by selectively diffusing the hydrogen through a heated semipermeable membrane, while maintaining across the membrane a magnetic field gradient which biases the oxygen away from the heated membrane. This promotes separation, minimizes the back-reaction of hydrogen and oxygen, and protects the membrane.

U.S. Pat. No. 5,126,111—dated Jun. 30, 1992, discloses a method of removing, reducing or detoxifying organic pollutants from a fluid, water or air, by contacting the fluid with a photoreactive metal semiconductor material in the presence of ultraviolet light of a wavelength to activate the photoreactive material. This is improved by simultaneously contacting the photoreactive material with a substance that accepts electrons and thus inhibits hole-electron recombination. Such substance will be ouch as to readily accept electrons either from the conduction band or from superoxide ions, and to rapidly dissociate into harmless products.

Still other photoreactors are described in U.S. Pat. Nos. 3,567,921; 3,769,517; 3,924,246; 4,296,066; 4,381,978; 4,454,835; 4,488,935; 4,544,470; 4,774,026; 4,863,608; 4,868,127; 4,957,773; 5,045,288; 5,094,815; and 5,149,377.

SUMMARY OF THE INVENTION

In the context of the present invention, "static mixing" and means therefor relate generally to mechanically passive mixing devices, whose mixing function is driven by fluid passage past stationary, fluid redirecting elements.

Broadly speaking, the present invention relates to a flow-through photochemical reactor comprising a fluid conducting channel. More particularly, the reactor includes a photon-transparent wall for admitting photons into the channel. The reactor further includes internally housed, static fluid-dynamic-effector means for passively inducing substantial transverse (ie radial) mixing flow within a fluid during that its longitudinal transit through the channel. This substantially increases the uniformity of the fluid's exposure to photons radiating through the wall and into the channel.

The foregoing embraces within its broad scope, embodiments in which a photon-transparent tubular reactor, (with the mechanically static, fluid-dynamic effector elements disposed internally thereof), with the light sources arranged externally of the channel, as for example, in a radial array around the tube's exterior. To make most efficient advantage of the photons emitted from a light source, however, it is preferred that the light source be located within the channel so that photons that radiate outwardly therefrom are made directly available for reaction in the surrounding fluid flow.

In accordance therefore with a more specific aspect of the present invention, there is provided a flow-through photo-chemical reactor which includes a reactor body, circumscribing a longitudinally extending channel having a generally annular cross section. The channel accommodates the passage of fluids between an inner wall of the reactor body and an outer wall of a photon transmitting tube. The tube is housed internally of the reactor, and is preferably arranged in co-axial alignment (ie longitudinally centered, concentric relation) relative to the inner wall of the reactor This preferred reactor according to the present invention, (as well as the others that are more generically described hereinbefore) includes an arrangement of mechanically static, fluid-dynamic elements. These "operate" by passively inducing or effecting a substantial turbulent flow within the fluid as it passes through the annular channel (in the case of the preferred embodiment), and this action substantially increases the uniformity of the fluid's exposure to photons radiating, from a source within that tube, into the fluid as it is conducted through the channel. Note too that mechanically-static elements, which can be advantageously employed in the present invention, would include those which can be manufactured from "transparent" materials.

Static effector elements suitable for use in the present invention are known in the mixing arts—where they are referred to as static mixers. Not all such will be entirely suitable for use in every embodiment of the present invention. Exemplary forms of such mixers are disclosed in a variety of U.S. patents, and elsewhere, and while not everyone is best or even equally suited to the present application, they each disrupt streamline flow and to that extent are potentially relevant to the present combination. Note, however, that the benefit of the present "static effector" (that is, as employed in the context of the combinations according to the present invention as contemplated herein) is directly tied to the efficacy with which it circulates flow to (and away) from the surface(s) through which the photons are transmitted. The most efficacious flow pattern is one in which photon-exposed fluid is displaced or replaced by fluid that is either unexposed or less exposed than the fluid that it displaces or replaces in proximity to the photon-transmitting surface (s). Given the economic (and hence industrial) advantages that attend in-line, longitudinal flow processes, the efficacy of a given static effector in especially preferred embodiments of the present invention is directly related to the degree to which a particular effector directs and redirects transverse (ie relative to the overall longitudinal flow of the fluid) flow toward the photon-transmitting surface(s) of the reactor.

By way of example, there is disclosed in U.S. Pat. No. 3,051,453 a baffle system which divides a main stream containing substances to be blended into a number of branches or portions of streams much in the manner of a family tree, displacing one partial stream with respect to adjacent partial streams while changing the cross-sectional shape thereof, and combining the partial streams in groups corresponding to the original dividing factor.

U.S. Pat. No. 3,620,506 discloses a fluid mixing apparatus which includes a plurality of stationary mixing units, formed of planar members, disposed in series longitudinally of a passage for sequentially and repeatedly dividing and recombining fluid flows during the travel thereof through the passage, with the fluid flows being directed along different serpentine paths after each division thereof.

U.S. Pat. No. 3,652,061, relates to a static element mixing tube that employs opposed angularly disposed baffles which provided mixing action by re-positioning of the stream. Mixing action at flow rates below turbulent level is generally independent of throughput.

U.S. Pat. No. 3,733,057, deals with an in-line spiral mixer that is characterized by successive left and right hand spaced spiral vanes disposed within a cylindrical tube. Each of the vanes comprises at least two separate parts with a central opening therebetween. The leading edge of each part is tapered from the outer to inner ends in the direction of fluid flow to minimize accumulation of material on the edge, which provides a self-cleaning action.

U.S. Pat. No. 4,034,965, concerns an apparatus for mixing or distributing a material or materials having no moving parts in which one or more elements are fitted into a conduit. Substantial radial displacement of material flowing in the conduit is achieved over a short distance with a minimum pressure drop. Each element initially imparts a rotational vector to the material stream and then transforms the rotational vector to a lateral or radial vector.

U.S. Pat. No. 4,179,222, relates to a device for generating special turbulence patterns in fluids flowing in pipes, such as for mixing, promoting chemical reactions, or accelerating the transfer of heat to or from the fluid through the pipe wall. Two or more Sets of flow dividers are mounted in the pipe, each set including a first and second flow divider with septum panel elements that overlap longitudinally of the pipe. The first flow divider septum elements mutually diverge downstream in a deflected longitudinal plane in longitudinally overlapping relationship with septum elements of the second flow divider mutually diverging upstream in a differing longitudinal plane so as to divert the fluid in such manner that the flow regions adjoining the pipe wall are caused to exchange positions with flow regions in the vicinity of the pipe axis. By reversing the relative incline angles of the septum elements of corresponding flow dividers of successive sets alternately when a succession of two or more sets are installed in direct series, the desired effects are augmented.

U.S. Pat. No. 4,314,974, relates to a liquid—liquid solvent extraction system, but discloses a static mixer—See, for example, FIG. 2 thereof.

U.S. Pat. No. 4,497,753, discloses a packing structure, for mixing or for exchange processes, in which there are at least two zig-zag layers, one of which has a number of parallel rows of substantially rectangular deflecting surfaces with alternating gaps in the inclined flanks. Bridges connect the rows of deflecting surfaces and are disposed in the troughs and at the apices of the corrugated layer.

U.S. Pat. No. 4,498,786, pertains to a method and a device for mixing at least two individual streams having different variables. In order to provide a low-loss effective mixing within a short flow section, at least one eddy impulse is producing the cross section of flow of at least one individual stream. This impulse spreads out downstream, transverse to the direction of flow, to form a discrete eddy system whose components transverse to the main direction of flow overlap into the other flow cross section of the other individual stream. This eddy impulse can be produced either by at least one curved surface or by at least one edge of a surface or of a body, but preferably by two burble (flow break-away) edges of a delta-shaped insert element which extend at an acute angle to each other.

U.S. Pat. No. 4,747,697, relates to a motionless fluid mixer for mixing two or more kinds of fluids, and has an elongated tubular casing into which a mixing element and a spacer are arranged in combination. The mixing element is provided with a helically twisted blade member.

These above exemplified static mixing devices, however, all presuppose applications in which the fluid conducting channel is a simple (and usually cylindrical) pipe structure. These would be suitable, without alteration, to such applications, but are not be so readily fitted to, or efficacious in, applications such as the preferred embodiment of the present invention that was introduced hereinabove, in which the light source resides in a tube laying concentrically within the "pipe". Nevertheless, they are exemplary of the state of the static mixing arts, and in the hands of persons skilled in the static mixing art, when taken in light of the teachings herein contained, provide sufficient basis for effecting at least some measure of the benefit associated with the present invention.

Other static mixing elements, however, lend themselves more readily to use in the combination according to the preferred practice under the present invention. By way of example, these include various of the elements as disclosed in U.S. Pat. Nos.: 3,337,194; 4,072,296; 4,093,188; 4,352,378; and 4,600,544.

Above-listed U.S. Pat. No. 3,337,194—dated Aug. 22, 1967, discloses an in-line blender for particulate materials, comprising in combination an elongated chamber having provided therein a plurality of baffle means each so adapted as to partially traverse said chamber thereby obstructing the path flow of solids at one or more points within said chamber.

Above-listed U.S. Pat. No. 4,072,296—dated Feb. 7, 1978, relates to a motionless mixer including a number of baffles attached to a central rod which is slidably mountable within a hollow cylindrical conduit, A cross-member is attached across the interior of the conduit and is configured to mate with a slot formed in the downstream end of the central rod, to prevent longitudinal motion or rotation of the mixer within the conduit.

Above-listed U.S. Pat. No. 4,093,188—dated Jun. 6, 1978, concerns the blending of two or more viscous fluids with a static mixer which comprises two or more banks of stationary baffles arranged around an axis parallel to the overall direction of flow of the fluids to be mixed. The baffles in each bank of the element are inclined at an angle to the overall flow axis and at an angle to the baffles of adjacent banks so that fluid streams are guided through windows or apertures formed by abutting baffles along the interface between adjacent banks.

Above-listed U.S. Pat. No. 4,352,378—dated Oct. 5, 1982, in which a ribbed construction, assembled from sheet metal bands for improved heat transfer, is built into the pipes of heat exchangers, to improve the heat exchange efficiency.

Above-listed U.S. Pat. No. 4,600,544—dated Jul. 15, 1986, relates to a packing unit having a set of deflectors within a cage for deflecting which of two fluids moving through the unit. The deflectors are arranged so that in any image of the unit formed by parallel rays projected onto a plane, regardless of how the unit is oriented with respect to the plane, at least half of the area enclosed by the perimeter of the image will be a shaded area, no more than 35 percent of the shaded area being produced by surfaces of the deflectors oriented at more than 60 degrees to the rays.

Moreover, in at least the case exemplified by the currently preferred embodiment of the present invention, there is some preliminary suggestion that the efficacy with which turbulent flow is induced may actually be inherently improved somewhat in an annular channel, as has been suggested may be the case in relation to certain embodiments of the present invention which employ the static fluid flow mixing apparatus of U.S. Pat. No. 4,929,088—dated May 29, 1990, and U.S. Pat. No. 4,981,368—Smith, (dated Jan. 11, 1991). The apparatus disclosed and illustrated In U.S. Pat. No. 4,929,088—Smith, (dated Mar. 29, 1990), is useful as a component of the present invention, and the disclosure of that patent is hereby expressly incorporated herein, in its entirety. Similarly, the method described in U.S. Pat. No. 4,981,368—Smith, (dated Jan. 1, 1991), is also hereby expressly incorporated herein in its entirety.

In accordance with the present invention, therefore, there is provided a particularly preferred embodiment, in which a central elongated photo-source is deployed within the static mixer conduit, in a central region of otherwise reduced mixing. Such a region, for example, tends to exist between diametrically-opposed, radially-convergent, cross-stream mixing flows within that conduit. In any case, this centrally-located body occupies a zone in which there would otherwise be a reduced cross-flow. The presence of this central photosource results in the fluid flowing past it tending to be more efficiently mixed—in that there is less of a tendency for an unmixed "channel" of longitudinal fluid flow to establish itself within the center of the conduit. More to the point, however, the exposure to the substrate of an optically dense fluid substrate is facilitated by ensuring that the substrate uniformly passes into the region around the photosource, in which a photo-chemically active dose of photon energy penetrates.

In an especially preferred embodiment according to the present invention, there is provided a static mixer conduit in which tabs are each arranged with respective edges (preferably leading upstream) adjacent to the conduit wall, and respective opposed edges (preferably trailing downstream) that are spaced radially inwardly from the conduit wall. These tabs are operable as fluid foils which, with fluid flowing through the mixer, have greater fluid pressures manifest against their upstream faces and reduced fluid pressures against their downstream faces. This pressure difference in the fluid adjacent to the respective mutually opposed faces of each of the tabs then causes the longitudinal flow over and past each tab to be redirected, thereby resulting in the addition of a radial cross-flow component to the longitudinal flow of fluid through the conduit.

The present invention further includes an improved method, in which the static mixing is performed over a longitudinal extent of a mixing volume having an annular cross section. More specifically, the method of the present invention relates to cross-stream mixing in a fluid flow, in which tabs mentioned herein, redirect a longitudinal fluid flow from an outer, fluid containment boundary surface, across an intervening space having an annular cross section towards an inner boundary surface. Preferably, the tabs are ramped and arranged in the fluid flow between the respective boundary surfaces, to cause the fluid to flow over the edges of each such tab to deflect the generally longitudinal fluid flow inwardly from the fluid containment boundary surface, across the intervening space (having the aforesaid annular cross section), towards an inner boundary surface. The inner boundary surface defines a volume which, but for the presence of that surface, would permit passage of a central longitudinal flow of non-uniform fluid mixing.

In a particularly preferred form the fluid flow over the edges of each tab results in the flow being deflected inward and up the inclined surface of the tab to generate a pair of tip vortices in the fluid flow past each tab. The vortices of each such pair have mutually opposed rotations, about an axis of rotation oriented generally along the longitudinal streamwise fluid flow direction, along the annular space between the two boundary surfaces.

DETAILED DESCRIPTION OF A PREFERRED EMBODIMENT

INTRODUCTION TO THE DRAWINGS

Figure 1:
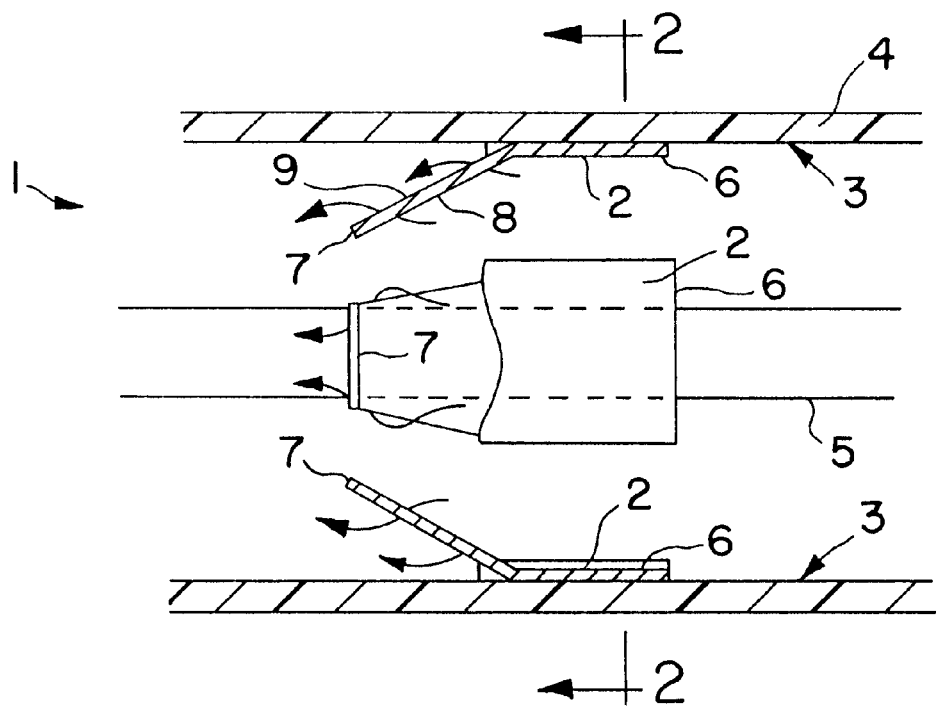
FIG. 1 is an elevated, longitudinal cross section through a static mixer according to the combination of the present invention.
Figure 2:
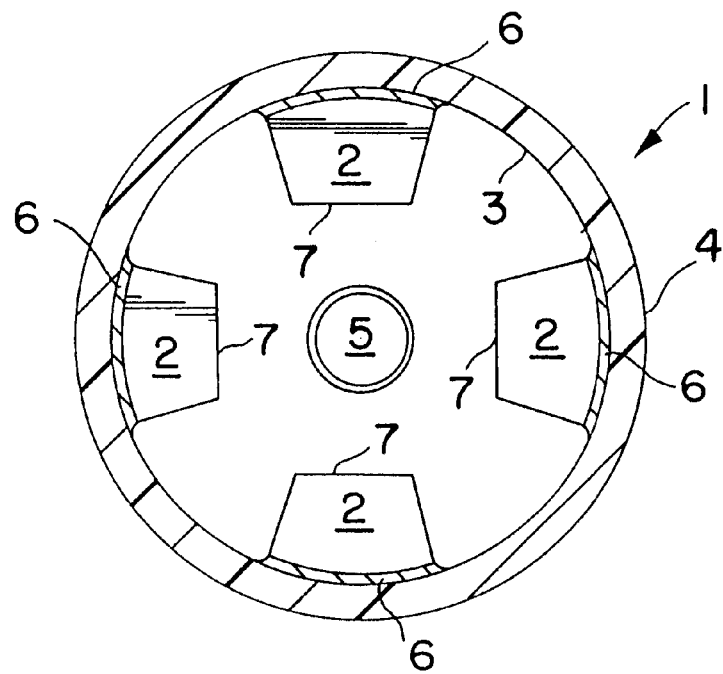
FIG. 2 is an elevated, transverse cross section taken through line 2—2 of the mixer depicted in FIG. 1.
Figure 3:
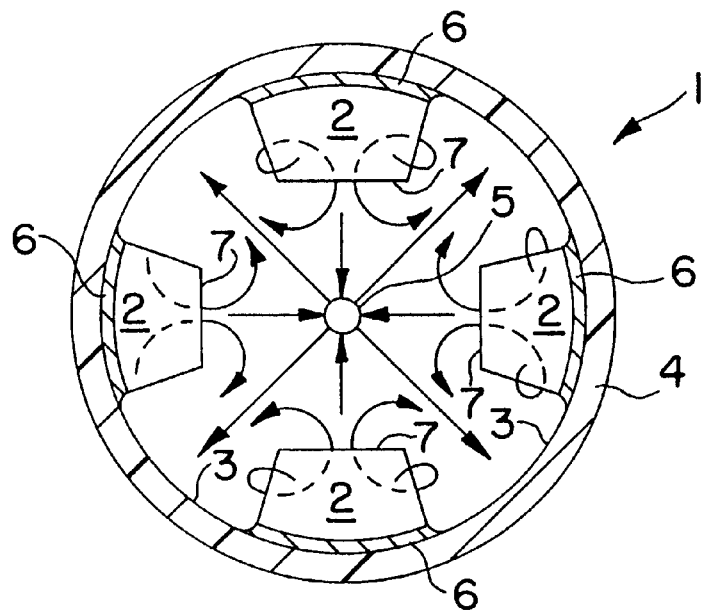
FIG. 3 is a reproduction of the view illustrated in FIG. 2, but further including representative fluid stream lines, to illustrate radial cross-flow patterns.
Figure 4:
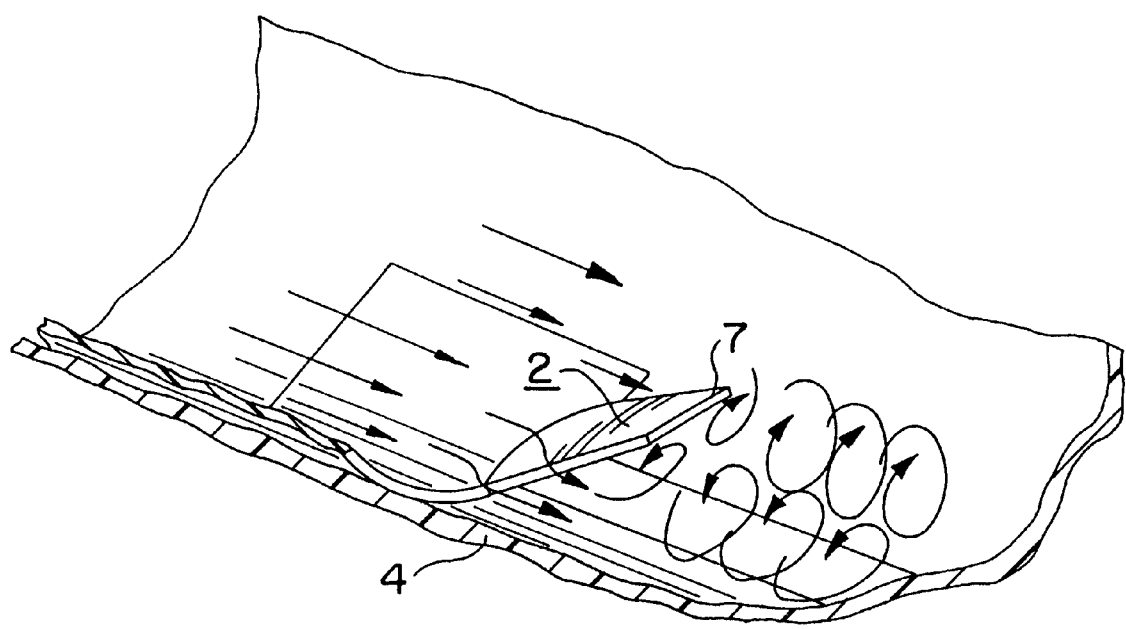
FIG. 4 is a cut-away perspective view illustrating vortex flow downstream of a single, representative tab; and, FIG. 5 is a photo reactor according to the present invention, including the features illustrated in the preceding Figures.

Referring now to FIGS. 1, 2 and 3, there is illustrated an embodiment according to the present invention, in which a static mixer 1, includes a series of tabs 2 that are secured to the side walls 3 of a conduit 4. A central photo source (eg a light source) 5 is arranged in coaxially aligned relation, centrally within the interior of conduit 4, where it occupies a region of inefficient mixing.

In the illustrated embodiment, that region forms between diametrically opposed, radially convergent, cross-stream mixing flows (see FIG. 3, in particular) within conduit 4.

Static mixer 1 comprises conduit 4, in which tabs 2 are each arranged with respective, (leading, upstream) edges 6 adjacent the conduit wall, and respective, (trailing, downstream) opposed edges 7 that are spaced radially inwardly from the conduit wall 3. Tabs 2 operate as fluid foils which, with fluid flowing through the mixer, have greater fluid pressures manifest against their upstream faces 8 (see FIG. 1) and reduced fluid pressures against their downstream faces 9 (see FIG. 1). This pressure difference in the fluid adjacent to the respective the mutually opposed faces of each of the tabs then causes the longitudinal flow over and past each tab to be redirected (as is illustrated by the various flow streamlines that are shown in the various figures), thereby resulting in the addition of a radial cross-flow component to the longitudinal flow of fluid through the conduit 4.

With phototube 5 occupying the zone of relatively poor mixing as described above, the fluid itself is precluded from forming eddies in that zone, in which the fluid would not be as thoroughly admixed with the balance of the fluid flow. In this relationship, the photochemical efficacy of the treatment can, in the hands of a person skilled in the art and in light of the. teachings herein contained, can be efficaciously managed.

Moreover, in operation, the photochemical reactor according to the present invention is performed over a longitudinal extent of a mixing volume having an annular cross section, located between the photon source 5 and side walls 3 of conduit 4. More specifically, there is cross-stream mixing in the longitudinal fluid flow through the present apparatus, in which tabs 2 redirect a longitudinal fluid flow from the outer, fluid containment boundary surface of side walls 3, across an intervening space having an annular cross section towards the inner boundary surface defining the outermost extent of photon source 5. Preferably, tabs 2 are ramped and arranged in the fluid flow between the respective boundary surfaces of side walls 3 and central photon source 5, to cause the fluid to flow over the edges of each tab 2 to deflect the generally longitudinal fluid flow radially inwardly from the fluid containment boundary surface of side wall 3, across the intervening space (having the aforesaid annular cross section), towards an inner boundary surface defined by the outermost surface of central body 5. The inner boundary surface of photon source 5 circumscribes a volume which, but for the presence of that surface, would permit passage of a central longitudinal flow of substantial, relatively non-uniform mixing.

Figure 5:
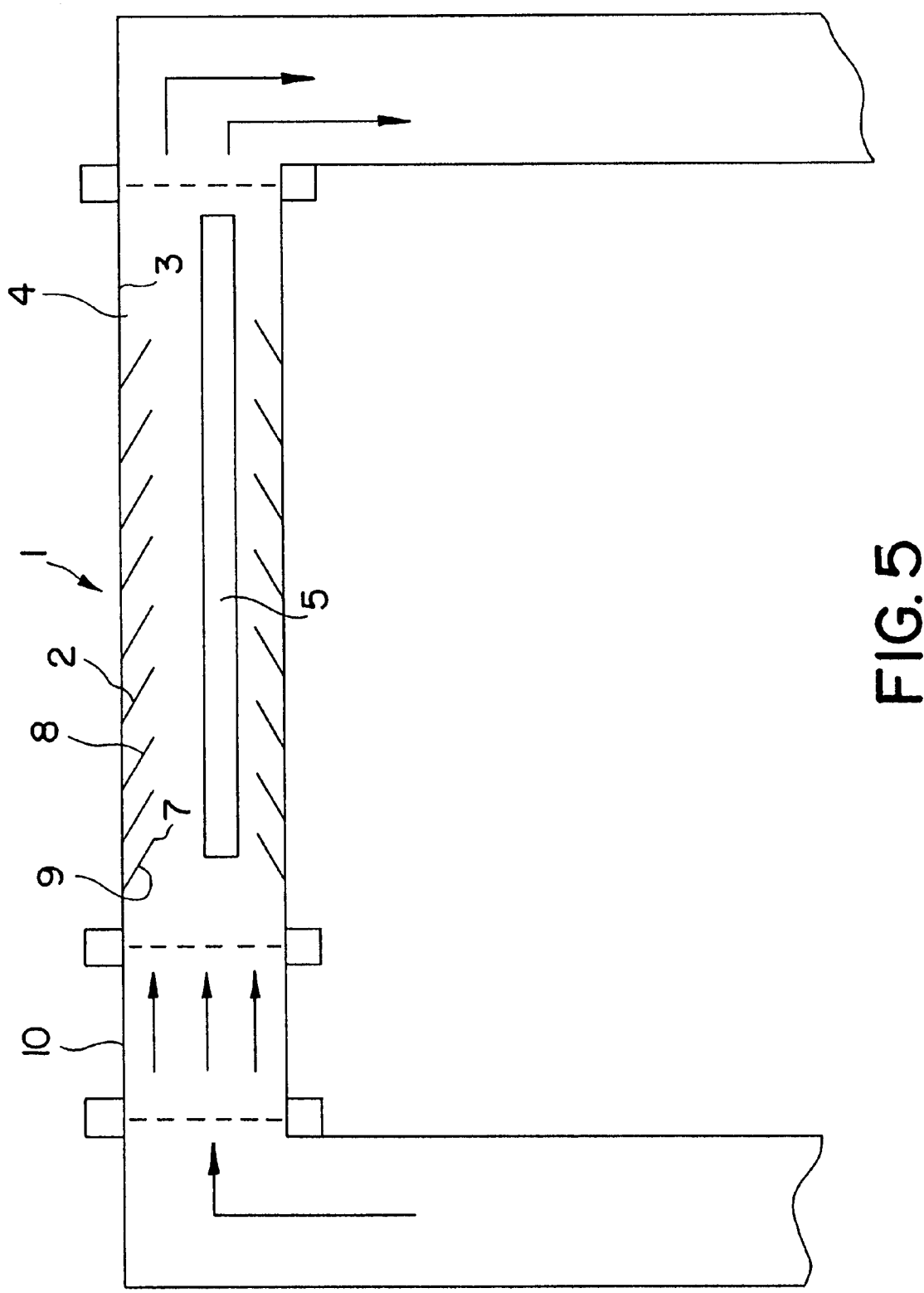

In FIG. 5, there is illustrated a longitudinal cross section along the length of a photoreactor according to the present invention that is particularly suited to the photochemical treatment of brewery beer wort. As described above, the photo reactor comprises a static mixer 1, that includes a series of tabs 2 that are secured to the side walls 3 of a conduit 4. A central photo source (eg a light source) 5 is arranged in coaxially aligned relation, centrally within the interior of conduit 4, where it occupies a region of inefficient mixing. The preferred static mixer 1 comprises conduit 4, in which tabs 2 are each arranged with respective, (leading upstream) edges 6 adjacent to the conduit wall, and respective, (trailing downstream) opposed edges 7 that are spaced radially inwardly from the conduit wall 3. Tabs 2 operate as fluid foils which, with fluid flowing through the mixer, have greater fluid pressures manifest against their upstream faces 8 (see FIG. 1) and reduced fluid pressures against their downstream faces 9 (see FIG. 1). This pressure difference in the fluid adjacent to the respective mutually opposed faces of each of the tabs then causes the longitudinal flow over and past each tab to be redirected (as is illustrated by the various flow streamlines that are shown in the various figures), thereby resulting in the addition of a radial cross-flow component to the longitudinal flow of fluid through the conduit 4. Still in relation to FIG. 5, phototube 5 occupies the zone of relatively poor mixing as described above, the fluid itself is precluded from forming eddies in that zone, in which the fluid would not be as thoroughly admixed with the balance of the fluid flow. In this relationship, the photochemical efficacy of the treatment can, in the hands of a person skilled in the art and in light of the teachings herein contained, be efficaciously managed. Also as depicted in FIG. 5, a plug flow length of pipe 10 is provided on the upstream side of the photo reactor, to ensure that the flow through the reactor is a "plug flow", to help further ensure uniformity of photochemical treatment in the reactor.

In a particularly preferred form the fluid flow over the edges of each tab results in the flow being deflected inward and up the inclined surface of the tab to generate a pair of tip vortices in the fluid flow past each tab. The vortices of each such pair have mutually opposed rotations, about an axis of rotation oriented generally along the longitudinal "streamwise" fluid flow direction, along the annular space between the two boundary surfaces.

The present invention is particularly useful in facilitating the photochemical treatment contemplated in copending U.S. patent application Ser. No. 08/208,908 filed Mar. 11, 1994, which is hereby incorporated, in its entirety, by reference.

We claim:

1. A flow-through photochemical reactor for photochemically treating a fluid therein, said reactor comprising:

A) a fluid conducting channel;

B) an inner boundary surface substantially centrally located within said channel and comprising means for transmitting photons into said channel; and C) static fluid-dynamic-effector means positioned in said channel for deflecting the flow of a fluid through said channel, thereby substantially increasing the uniformity of said fluid's exposure to said photons being transmitted into said channel, said effector means comprising a plurality of motionless, ramped tabs having inclined surfaces and trailing downstream edges directed inwardly into said channel toward said inner boundary surface to permit a longitudinal fluid flow in a space between said downstream edges and said inner boundary surface, said tabs providing cross-stream mixing in said longitudinal fluid flow by deflecting said fluid over said edges of each of said tabs inwardly and upwardly along said inclined surface toward said inner boundary surface thereby generating a pair of tip vortices in said longitudinal fluid flow past each tab, each vortex of each of said pair of tip vortices being mutually opposed in rotation about an axis of rotation oriented along said longitudinal fluid flow and along said space between said edges and said inner boundary surface.

2. The reactor of claim 1 wherein said tabs are transparent.

3. The reactor of claim 1 wherein the inner boundary surface is the outer wall of a photon transmitting tube.

4. The reactor of claim 2 wherein the inner boundary surface is the outer wall of a photon transmitting tube.

5. A method for photochemically treating a fluid comprising flowing said fluid through a flow-through photochemical reactor, said reactor comprising:

A) a fluid conducting channel;

B) an inner boundary surface substantially centrally located within said channel and comprising means for emitting photons into said channel; and C) static fluid-dynamic-effector means positioned in said channel for deflecting the flow of a fluid through said channel, thereby substantially increasing the uniformity of said fluid's exposure to said photons being emitted into said channel, said effector means comprising a plurality of motionless, ramped tabs having inclined surfaces and trailing downstream edges directed inwardly into said channel toward said inner boundary surface to permit a longitudinal fluid flow in a space between said downstream edges and said inner boundary surface, said tabs providing cross-stream mixing in said longitudinal fluid flow by deflecting said fluid over said edges of each of said tabs inwardly and upwardly along said inclined surface toward said inner boundary surface thereby generating a pair of tip vortices in said longitudinal fluid flow past each tab, each vortex of each of said pair of tip vortices being mutually opposed in rotation about an axis of rotation oriented along said longitudinal fluid flow and along said space between said edges and said inner boundary surface.

6. The method of claim 5 wherein said tabs are transparent.

7. The method of claim 5 wherein the inner boundary surface is the outer wall of a photon transmitting tube.

8. The method of claim 6 wherein the inner boundary surface is the outer wall of a photon transmitting tube.

* * * * *